United States Patent

Feichtner

[11] Patent Number: 5,825,464
[45] Date of Patent: Oct. 20, 1998

[54] CALIBRATION SYSTEM AND METHOD FOR LIDAR SYSTEMS

[76] Inventor: John D. Feichtner, 28437 Christopher's La., Los Altos, Calif. 94022

[21] Appl. No.: 778,899

[22] Filed: Jan. 3, 1997

[51] Int. Cl.[6] ............................. G01C 3/08; G01C 25/00
[52] U.S. Cl. ............................................. 356/4.02; 356/6
[58] Field of Search ......................................... 356/4.02, 6

[56] References Cited

U.S. PATENT DOCUMENTS

| | | | |
|---|---|---|---|
| 4,121,890 | 10/1978 | Braun | 356/5 |
| 4,232,971 | 11/1980 | Suga | 356/446 |
| 4,552,454 | 11/1985 | Glaser et al. | 356/5 |
| 4,770,526 | 9/1988 | Manhart et al. | 356/5 |
| 5,264,905 | 11/1993 | Cavanagh et al. | 356/6 |
| 5,270,929 | 12/1993 | Paulson et al. | 364/420 |
| 5,311,272 | 5/1994 | Daniels et al. | 356/5 |
| 5,335,070 | 8/1994 | Pflibsen et al. | 348/31 |
| 5,606,409 | 2/1997 | Schneiter | 356/4.02 |

*Primary Examiner*—Mark Hellner

[57] ABSTRACT

A calibration system and method include isotropically diffusing high-intensity light emitted from a detection apparatus, with the diffused light being coupled to at least one optical line, typically an optical fiber. In the preferred embodiment, the apparatus to be calibrated is a light detection and ranging (LIDAR) apparatus and the isotropic diffusion is achieved by means of an integrating sphere. For calibrating distance calculations, the optical fiber includes a reflecting mechanism, such as Bragg gratings, at a fixed and known distance from the input end of the optical fiber. The reflecting mechanisms simulates the presence of a remote object at the known distance. For a velocity calculation, a frequency offset may be introduced to the light propagating through the optical fiber, thereby simulating a Doppler shift induced by a moving object. The simulations of the presence and movement of remote objects are used to calibrate the apparatus.

19 Claims, 3 Drawing Sheets

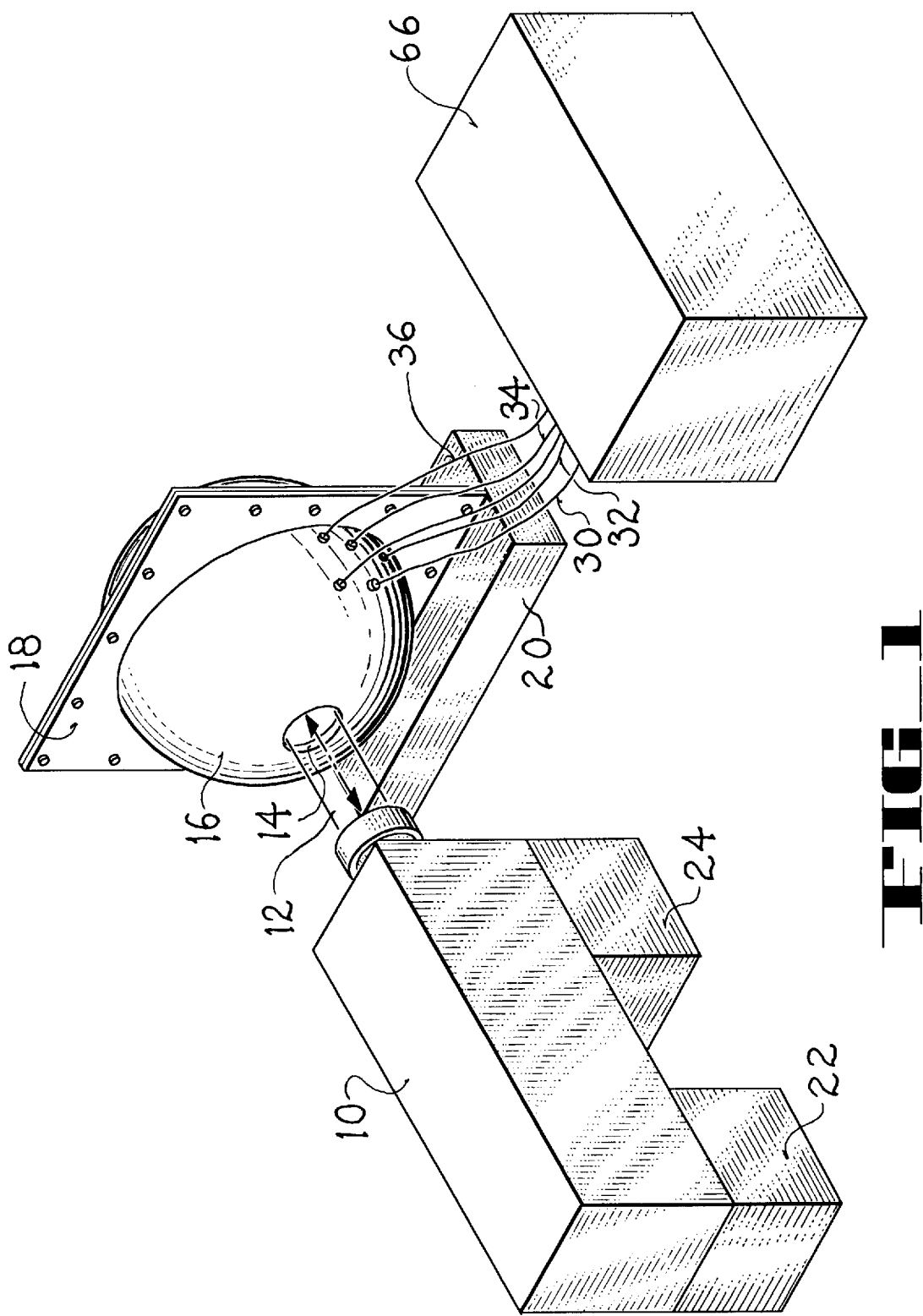
FIG_1

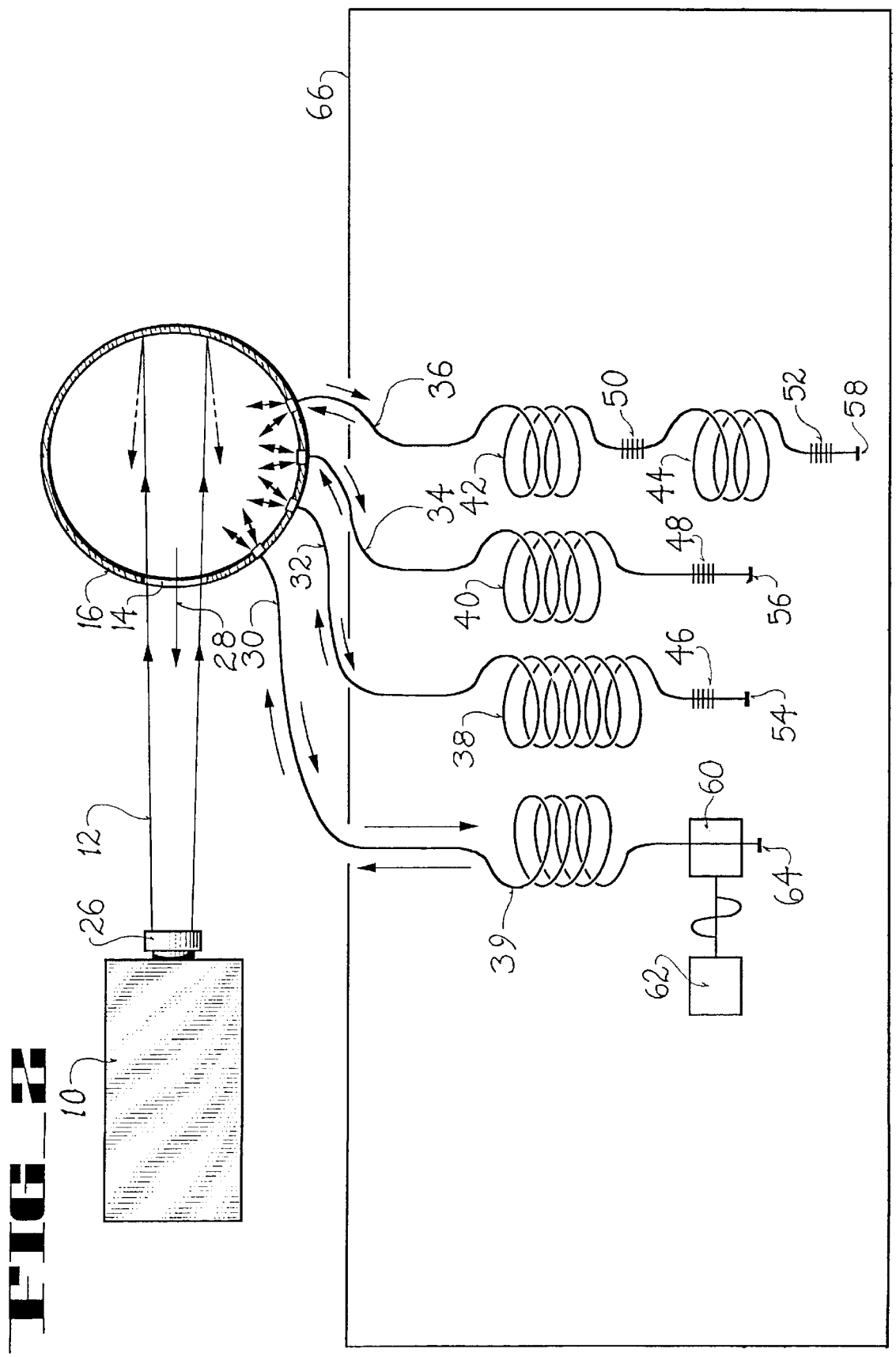
FIG_2

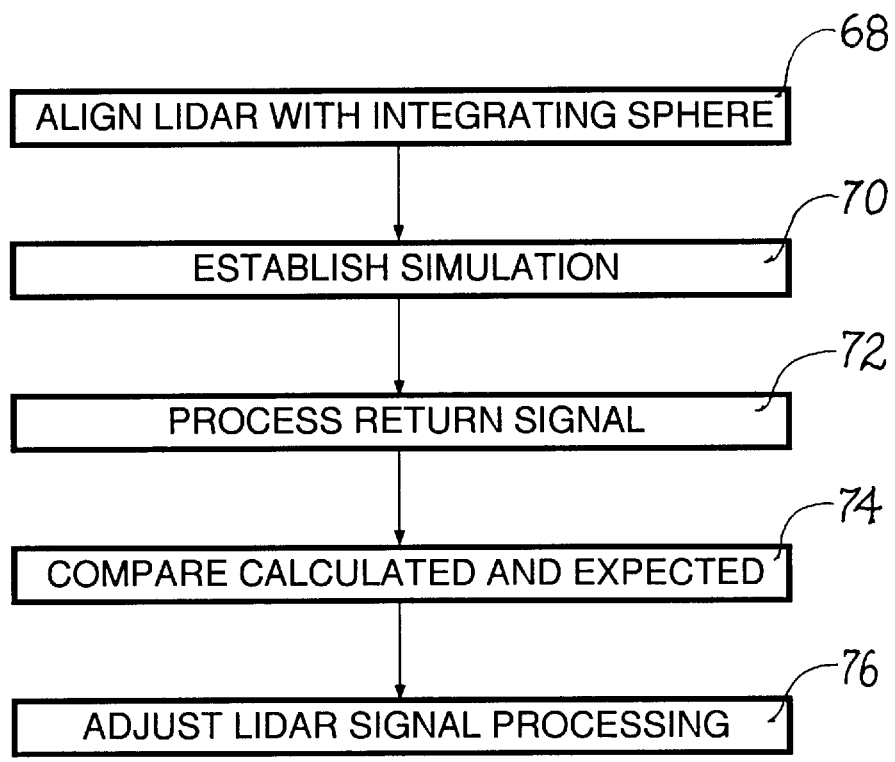
FIG_3

CALIBRATION SYSTEM AND METHOD FOR LIDAR SYSTEMS

TECHNICAL FIELD

The invention relates generally to systems and methods for calibrating and testing light-emitting apparatus for determining the range and/or velocity of remote objects and relates more particularly to calibrating a light detection and ranging apparatus.

BACKGROUND ART

There are a wide variety of applications for apparatus which determine the distance and/or the velocity of remote objects by means of detecting backscattered light. Atmospheric conditions can be studied by detecting backscattered light from dust particles, smoke, snow, or fog. U.S. Pat. No. 5,311,272 to Daniels et al. describes a law enforcement application in which a light beam is projected into a body of water for the purpose of detecting submerged contraband-carrying containers. In a military application, the distribution of winds may be determined in order to calculate the necessary gunsight adjustment for offsetting effects of wind between a gun source and a target.

A light detection and ranging (LIDAR) apparatus projects a light beam, typically a laser beam, in the direction of a region of interest and utilizes backscattered light as a basis for region interrogation. With regard to stationary objects within the region, distance may be the only concern. The transit time for light returned to the LIDAR apparatus is a function of the distance between the apparatus and the object which causes the backscattering. Calculating the time interval between projecting a laser pulse and receiving backscattered light provides an accurate means of calculating distance, or range. With regard to moving objects, a velocity calculation may be desired. A LIDAR beam sent to, and backscattered from, an object moving relative to the LIDAR transmitter/receiver system is frequency-shifted by an amount directly proportional to the relative velocity between LIDAR and an object. Consequently, the relative velocity of the object can be determined by generating the difference frequency between the backscattered signal and the outgoing beam. In order to accomplish this comparison accurately, the laser frequency must remain very stable during the time it takes the transmitted light beam to go out to the target and the backscattered signal to return, otherwise the backscattered signal will be compared to an invalid reference frequency. Compared to the center frequencies of typical lasers ($10^{13}$ to $10^{15}$ Hertz), the typical frequency differences involved in velocity measurements are very small ($10^9$ Hertz for high speed missiles and aircraft, to $10^3$ Hertz for wind velocity measurements). In calibration of a velocity measuring LIDAR system, simulating a backscattered signal requires a source that is coherent with the transmitter and offset from it in frequency by only a small fraction of the transmitter center frequency.

Precise calculations of range, velocity, and other factors determined by the LIDAR apparatus require that the LIDAR apparatus be precisely calibrated throughout the useful life of the apparatus. Conventionally, the calibration process is labor intensive. A lengthy testing range is prepared by providing a fine optical alignment between the LIDAR apparatus and a distant "hard target" which consists of a flat surface with a coating having calibrated reflectance and diffuse-scattering properties. The fine alignment positions the hard target surface at a ninety degree angle to the output beam of the LIDAR apparatus and at a known and fixed distance from the LIDAR apparatus. The return light signal scattered back from the hard target is received by the apparatus and is compared to expected signal characteristics of the target, the range geometry, and the atmospheric conditions. If the actual return light signal is different than the expected light signal, the apparatus is adjusted accordingly.

This conventional calibration approach often requires obtaining a right of access and a permit to transmit the laser beam over the range property. Moreover, at least two persons are required during the initial alignment of the hard target, since the hard target may be one kilometer from the LIDAR apparatus. Another concern is that inclement weather will adversely affect the calibration process, since fog, rain and snow will introduce backscattering and severely attenuate the beam intensity over the open range. Furthermore, unless the output beam is eye-safe, safety measures must be used to assure that no person in the vicinity of the testing range receives excessive eye exposure to the laser beam energy. The conventional calibration process is applied to ocean-going LIDAR imaging in U.S. Pat. No. 5,311,272 to Daniels et al. The patent describes deploying air-dropped buoys for use as calibrated targets for a system which images submerged objects. The calibrated optical buoys may be deployed by a helicopter.

U.S. Pat. No. 5,264,905 to Cavanagh et al. describes automated test equipment that overcomes many of the concerns with the conventional calibration process. A portion of an output beam from a laser rangefinder is directed to an inlet port of an integrating sphere which disperses the beam for exit through two outlet ports. The first outlet port is connected to a radiometer for measuring the dispersed energy. This measurement is used to determine the energy output of the laser rangefinder. The second outlet port communicates with an avalanche photo diode (APD) that detects the pulse envelope of the laser beam. The pulse envelope is connected in parallel to two separate measuring circuits for determining the pulse width and the pulse interval. A third connection from the APD is made to a pulse delay generator which generates a delayed trigger signal. The delayed trigger signal is input to a laser diode that generates a laser pulse to simulate the return of backscattered energy to the laser rangefinder. The laser pulse that is generated by the laser diode is directed to the integrating sphere for return to the laser rangefinder. The duration of the time interval between the sending of the signal from the laser rangefinder to the reception of the artificially generated return signal is calculated and used as the basis for calibrating the LIDAR apparatus. The pulse delay generator is programmable, so that the time interval can be adjusted to provide a more thorough calibration.

The automated test equipment of Cavanagh et al. overcomes many of the concerns associated with the conventional calibration process. The automated test equipment may be used indoors and requires less space. The laser diode that is triggered to simulate a return signal has sufficient intensity to be reliably detected by the laser rangefinder. However, in calibration of a LIDAR velocity measurement system, as previously noted, the simulated signal must be coherent with the frequency shifted by only a small fraction from the center frequency of the LIDAR transmitter. A triggered laser diode as described by Cavanagh et al. does not possess the required coherence nor a center frequency that is close enough to the transmitter center frequency to accomplish a velocity calibration. In addition, in some calibration operations, a strong signal return such as that provided by a triggered laser diode may not be desirable. For example, if the LIDAR apparatus is to be used to measure atmospheric parameters, such as wind velocity or wind velocity distribution, accurate calibration may not be achieved when the return signal from a hard target or the laser diode of Cavanagh et al. is many orders of magnitude higher than the return signal that will be received in the actual application. This is because, in the practical application, the return light signal is the low level backscattered light from small aerosol particles entrained in the air, at some distance from the receiver. The receiver optics and electronics are optimized to detect these small levels, and could be saturated or damaged by very high signal levels. In addition, because the actual signal levels are so low, it is customary to employ signal pulse accumulation over many hundreds of successive output pulses, followed by sophisticated signal processing circuits and software to extract the velocity information. The high level signals provided by hard targets or triggered laser diodes do not allow the "end-to-end" testing of the receiver system through the signal processing electronics and software.

Another concern in the Cavanagh et al. approach is that the calibration of the laser rangefinder is dependent upon the proper calibration of the automated test equipment. For example, if the pulse delay generator is improperly calibrated, the laser rangefinder will be inaccurately calibrated. There must also be a precise time-compensation for the delays caused by the electrical operations that occur for artificially generating the return light signal. The return light signal is generated by the equipment only after operation of the APD, the pulse delay generator, and the laser diode.

What is needed is a system and method for calibrating and testing a light-emitting apparatus for detecting remote objects by means of backscattered light, with the system and method being applicable to achieving thorough calibration over a wide range of return light signal strengths.

SUMMARY OF THE INVENTION

A calibration system and method include diffusing high-intensity light emitted from a detection and/or ranging apparatus, with the diffused light being distributed substantially isotropically. In the preferred embodiment, the apparatus is a light detection and ranging (LIDAR) apparatus which directs an output beam into an integrating sphere that provides the isotropic diffusion. At least one optical line, typically an optical fiber, has a first end positioned to receive a portion of the diffused light. The presence of a remote object is simulated by causing reflection along the optical line at a known distance from the first end. The reflection may be effected by several means, including cutting and polishing the end of the fiber (a reflective coating may be deposited on the polished surface), or fabricating Bragg gratings in localized sections of the body of the fiber. The reflected light is returned to the diffusion surface (e.g., the substantially spherical interior of the integrating sphere) for forming a return light signal to the LIDAR apparatus. Since the simulated remote object is at a known position, the return light signal may be used to calibrate the LIDAR apparatus.

In another embodiment, both the first end and the second end of the fiber can be embedded in the sphere surface. The result is that a portion of the LIDAR output light coupled into the integrating sphere enters each end of the fiber, travels its length, and is radiated out the other end back into the sphere after being delayed. Both pulses overlap at the receiver. Bragg gratings can be fabricated into the fiber at various points to simulate targets at various ranges.

Bragg gratings may be formed along an optical fiber in order to provide the reflection that simulates the presence of a remote object. Bragg gratings may be formed anywhere along the length of an optical fiber using conventional ultraviolet processing techniques. By controlling the intensity of the ultraviolet radiation, the induced reflectivity can be controlled. This provides flexibility in the object-simulating design. Moreover, more than one Bragg grating can be used on a single optical line, so that multiple objects can be simulated, thereby increasing the thoroughness of the testing and calibration operation. However, in the preferred embodiment, there are a number of optical fibers having first ends that are embedded into the wall of the integrating sphere, with each optical fiber having a Bragg grating or other structure that causes reflection by introducing a significant change in the index of refraction along the optical fiber, e.g., a reflective coating at the end of the optical fiber.

Also in the preferred embodiment, at least one optical fiber is coupled to a modulator mechanism that shifts the frequency of the light along the optical fiber. The shift in the light frequency simulates a Doppler shift initiated by a moving object. Introducing a known frequency shift provides a means for calibrating velocity-calculation capability of the LIDAR apparatus. The frequency shifts may be introduced by an acousto-optic modulation or an electro-optic modulation, using either bulk or surface wave acousto-optic modulators, or bulk or integrated-optical electro-optic modulators.

While the preferred embodiment allows both distance calibration and velocity calibration, this is not critical. The system and method may be used to accomplish only one of the operations. For example, the LIDAR apparatus may be aligned to direct a laser beam through an aperture in the integrating sphere having at least one optical fiber connected to receive a portion of the diffused laser beam. The frequency of the light propagating through the optical fiber may be modulated to simulate a Doppler shift, thereby simulating backscattering from a moving object. Because the frequency shift is fixed, the LIDAR apparatus may be adjusted such that its calculation of velocity coincides with the expected calculation of velocity.

An advantage of the invention is that the system is compact and does not require a lengthy testing range in order to calibrate an apparatus which bases determinations relating to remote objects upon received backscattered light. The optical fibers are lengthy, but can be coiled to minimize the required space. Another advantage of the invention is that a fine optical alignment of the calibration equipment with the apparatus of interest is not required. Moreover, the approach minimizes the amount of laser radiation that is propagated into a test area. In fact, the system is sufficiently compact to enclose the entire system in a light-tight container, eliminating the danger of eye exposure to laser radiation.

Another advantage of the invention is that it does not require propagation of the LIDAR signal through the atmosphere, so that the calibration operation is immune to weather disturbances. The approach can be used to simulate a collection of targets at different ranges, without the need to set up a target at each range of interest. The approach can also be used to simulate Doppler target returns.

Perhaps the most important advantage of the invention is that the system and method can be used to provide "end-to-end" testing of the equipment and the signal processing hardware and software of a LIDAR apparatus (in particular, coherent LIDAR systems), using passively backscattered signal returns that closely simulate the real application, especially those applications and situations where the return is so small that signal pulse accumulation techniques must be employed. As an example, in applications such as wind distribution measurements, the return light signal is a weak signal. The data for calculating wind are acquired by detecting backscattering from aerosol particles. To provide reliable calculations, the signal processing algorithms of the LIDAR apparatus may accumulate returned signals from successive pulses until an accumulative signal has sufficient strength for reliable signal processing. If a calibration system provides only strong return signals, the signal accumulation operation will not be tested. However, the present invention diffuses the return light signals at the integrating sphere in the same manner that the incoming beam from the LIDAR apparatus is diffused. The diffusion of the return light signals ensures that the front-end signal process is adequately tested.

BRIEF DESCRIPTION OF THE DRAWINGS

FIG. 1 is a schematical perspective view of a calibration system for a light-emitting detection apparatus, in accordance with the invention.

FIG. 2 is a side schematical view of the system of FIG. 1.

FIG. 3 is a process flow of the calibration method using the system of FIGS. 1 and 2.

BEST MODE FOR CARRYING OUT THE INVENTION

With reference to FIGS. 1 and 2, a LIDAR apparatus 10 is shown as being positioned to direct an output beam 12 into an aperture 14 of an integrating sphere 16. The conventional LIDAR apparatus includes a transceiver and signal processing circuitry. Typically, the output beam 12 is a pulsed laser beam, but continuous radiation is used in some applications. The LIDAR apparatus has a high energy source that may be projected over extended distances to detect remote objects and to calculate the range and/or velocity of the remote objects. For example, the high-intensity laser output may be directed across a region of interest in order to determine the wind velocity distribution across the region. Calculations of wind velocity may be based upon Doppler shifts induced by moving aerosol particles from which the light is backscattered. Distance calculations are based upon transit time of the projected and backscattered radiation. In FIG. 1, the integrating sphere 16 that is used for calibrating the LIDAR apparatus is fixed in place by a support frame 18 on a base 20. The LIDAR apparatus is properly aligned with the aperture 14 of the integrating sphere by blocks 22 and 24. However, the alignment structure is not critical to the invention, since fine alignment of the output beam is not critical.

The spherical interior surface of the integrating sphere 16 converts the intense, collimated LIDAR output beam 12 into a uniform illumination of the interior sphere. That is, the integrating sphere diffuses the output beam 12 substantially isotropically within the field defined by the sphere. The preferred diameter of the integrating sphere is dictated by the diameter of the output aperture at a lens 26 of the LIDAR apparatus 10. The diameter of the aperture 14 of the integrating sphere is generally equal to the output aperture diameter of the LIDAR apparatus. This ensures that the entire LIDAR output beam is accepted into the integrating sphere 16 and ensures that the entire return light signal 28 is mapped into the receiver aperture of the LIDAR apparatus. As is known in the art, the diameter of the aperture 14 of the integrating sphere should not exceed twenty percent of the diameter of the integrating sphere. That is, the diameter of the sphere should be at least five times the diameter of the output aperture of the LIDAR apparatus.

Increasing the ratio of the diameter of the integrating sphere 16 to the diameter of the aperture 14 reduces the laser intensity at localized regions of the interior surface of the sphere. As will be explained more fully below, the positive effect of the intensity reduction is that optical fibers 30, 32, 34 and 36 are less susceptible to laser-induced damage. On the other hand, the signal-to-noise ratio will likely degrade with the increase in the ratio of the diameters.

Referring specifically to FIG. 2, after the beam 12 is made isotropic and is reduced in intensity inside the integrating sphere 16, it can be safely coupled to the optical fibers 30, 32, 34 and 36. Each optical fiber has a first end that is embedded into the spherical wall of the integrating sphere 16. The intensity of the light that is coupled to each optical fiber depends upon the physical characteristics of the fiber, e.g., the Numerical Aperture. The optical fibers may be either multimode or single mode fibers, depending on the situation to be simulated and the wavelength of the LIDAR system. Single mode fibers have smaller diameters than multimode fibers, and thus sample less of the integrating sphere flux; if the fiber exhibits low optical absorption loss at the laser wavelength, the smaller flux coupled into the single mode fiber will not be severely attenuated and the simulated return signal from the fiber exit end will be sufficient for calibration. Single mode fibers are less bulky and easier to handle. However, the present state-of-the-art in fibers is such that, for wavelengths longer than about 1.9 micrometers, fibers available commercially in long lengths (say 0.5 kilometers or longer) exhibit prohibitive absorption losses. At such longer wavelengths, therefore, a multimode fiber would be preferred, because its larger diameter allows a larger portion of the integrating sphere flux to be coupled into the fiber. The multimode fibers are, however, bulkier and heavier, and may also be more costly. The choice of fiber type will be subject to these trade-offs.

Three of the optical fibers 30, 32 and 34 include a single coil 38, 39 and 40, while a fourth optical fiber 36 includes two coils 42 and 44. The coils merely designate a long length of fiber, and coiling has no function except to make the apparatus more compact. After each of the coils, the optical fibers have Bragg gratings 46, 48, 50 and 52. The introduction of Bragg gratings along the length of an optical fiber is well known in the art. Ultraviolet processing may be used to form the Bragg gratings and the intensity of the ultraviolet radiation controls the degree of reflection that will occur at the Bragg gratings. For example, Bragg gratings 46, 48 and 52 may be fabricated to provide a maximum reflection, while the Bragg grating 50 may be fabricated to allow sufficient light passage to allow each of the Bragg gratings 50 and 52 of the optical fiber 36 to simulate the presence of a remote object. In the ideal, the Bragg grating 50 reflects a selected percentage of the light propagating from the integrating sphere 16, and transmits a known fraction of the light that has been reflected from the second Bragg grating 52 of the optical fiber 36.

Light that is reflected at one of the Bragg gratings 46–52 re-enters the integrating sphere 16 and is again diffused. The diffused returned light defines the return light signal 28 that is directed back to the LIDAR apparatus 10. The return light signal is processed in the conventional manner at the LIDAR apparatus. Thus, the Bragg gratings 46–52 are viewed as remote objects by the LIDAR apparatus.

The distances of the Bragg gratings 46–52 from the integrating sphere 16 are selected in accordance with the desired simulated presence of a remote object. That is, the Bragg gratings are positioned to provide reflection to simulate backscattering at a known distance from the LIDAR apparatus 10. Optionally, optical fibers having equal lengths are connected to the integrating sphere 16, so that the return light signal 28 is an additive signal that simulates a single remote object. However, in the embodiment of FIG. 2, the four Bragg gratings 46–52 will be viewed as four different remote objects by the LIDAR apparatus, since the Bragg gratings are at four different distances from the integrating sphere 16. The differences in the lengths of the optical fibers 32, 34 and 36 are represented schematically by the differences in the number of windings of the various coils 38, 40, 42 and 44.

While not critical, the optical fibers 32, 34 and 36 are sufficiently long to allow simulation of signal delay that would take place if a remote object was at a distance of at least 0.5 kilometers from the LIDAR apparatus 10 and the light propagation was through the atmosphere. For example, the Bragg grating 50 may be positioned to simulate the presence of an object at a distance of 0.5 kilometers from the LIDAR apparatus 10, and the Bragg grating 46 may be positioned to simulate an object at a distance of 1.0 kilometers from the LIDAR apparatus. The range calculations by the LIDAR apparatus 10 are typically determined by the time difference between the projection of the output beam 12 and the reception of the return light signal 28. As will be appreciated by persons skilled in the art, the range calculation also requires consideration of the refractive indices of the propagation media. The propagation medium between the LIDAR apparatus and the first ends of the optical fibers 30–36 is air and has a refractive index of slightly greater than 1. The refractive index of the optical fibers is significantly higher than 1 and will vary with the selection of optical fiber material. A conventional single mode optical fiber has a refractive index in the range of 1.5 to 2. A typical refractive index for a multimode fiber is approximately 1.44. The Bragg gratings 46–52 are precise distances from the interrogating sphere 16, but the precise locations will vary depending upon the refractive index of the optical fibers.

The reflections at the ends of the three optical fibers 32, 34 and 36 have been described as being induced by Bragg gratings 46, 48 and 52. However, the reflection may be caused by other known means for abruptly changing the refractive index. In a simplest form, reflective caps 54, 56 and 58 are provided at the ends of the fibers. Each reflective cap may be a coating. Nevertheless, the Bragg gratings are utilized in the preferred embodiment, since they allow multiple reflections on a single optical fiber 36 and because Bragg gratings may be written permanently or transiently.

The optical fiber 30 is coupled to a frequency modulation device 60. A source 62 of a modulating signal provides an input for selectively varying the frequency of light propagating through the optical fiber. In one embodiment, the source 62 is a signal generator and the modulation device 60 is an electro-optic modulator. In another embodiment, the modulation device 60 is a surface wave or bulk wave acousto-optic modulator. The modulator drive signal from the radio frequency source 62 activates the modulator 60 which induces a frequency offset to the light signal that is returned to the integrating sphere 16 from the first optical fiber 30. The frequency offset simulates Doppler shifts caused by moving objects, such as aerosol particles borne by the wind. Velocity calculations by the LIDAR apparatus 10 can be calibrated by controlling the frequency offset that is introduced at the modulation device 60.

The first optical fiber 30 is shown as not including a Bragg grating. The reflection of the light that enters the fiber is accomplished by a reflective termination at the fiber end, fabricated by cutting a face on the fiber and coating the face with a coating designed to reflect a desired fraction of the incident light at the laser wavelength. Alternatively, a Bragg grating can be fabricated at the end to accomplish the reflection. The modulator 60 does not affect the reflective operation of either the grating or reflective coating termination at the fiber end.

In FIGS. 1 and 2, the LIDAR apparatus 10 is shown as being a short distance from the integrating sphere 16 and the integrating sphere is shown as being outside of a housing 66 that contains the remainder of the calibration system. In the preferred embodiment, the integrating sphere is contained within the housing 66. Moreover, the LIDAR apparatus abuts the housing 66. Thus, a light-tight containment is achieved, so that the likelihood of eye exposure to laser radiation is significantly reduced.

The calibration operation is described with reference to FIGS. 1–3. In step 68, the LIDAR apparatus 10 is aligned with the integrating sphere 16. The alignment is not critical, as noted previously. The output beam 12 is directed through the aperture 14 to the interior of the integrating sphere. The interior surface of the integrating sphere diffuses the input beam substantially isotropically, so that the light intensity is significantly attenuated at the surface regions at which the optical fibers 30, 32, 34 and 36 are embedded. The attenuation is achieved without utilizing filters that might affect the calibration process. As a result of the attenuation, the light nondestructively propagates through the optical fibers.

In step 70, the system simulates the presence of remote objects. If the only concern is calibrating the LIDAR apparatus 10 for distance measurements, the frequency modulation device 60 is not required. Instead, signals from the reflections at the Bragg gratings 46, 48, 50 and 52, or from reflective ends fabricated on the fibers, are considered. The isotropically diffused beam from the integrating sphere 16 is coupled directly to the coiled multimode optical fibers 32, 34 and 36. The light that propagates from the integrating sphere is reflected at the Bragg gratings and returned to the interior of the integrating sphere. The light is again diffused, but provides the return light signal 28. This double diffusion is advantageous for calibrating a LIDAR apparatus 10 for use in detecting and signal processing low-level return signals, such as those backscattered from aerosol particles entrained in the wind at some distance from the LIDAR.

High intensity return signals would not necessarily test all aspects of the LIDAR apparatus. For example, if weak return signals are accumulated until a threshold signal strength is reached, a calibration signal having high intensity return signals would not adequately test the signal processing algorithm responsible for accumulating weak return signals. Alternatively or additionally, the simulation step 70 provides a frequency offset to simulate a moving object. The frequency offset has a known value. The acousto-optic or electro-optic modulators can also be frequency-tuned over ranges sufficiently broad to simulate the target velocity variations expected in practice. This tests the entire velocity range capability of the receiver system.

In step 72, the return light signal 28 is received at the LIDAR apparatus 10 and undergoes signal processing. The type of signal processing is not critical to the invention and may be carried out using any known processing techniques. For range calculations, the LIDAR apparatus may provide distance values for each of the remote objects for which an object presence is simulated by the Bragg gratings 46, 48, 50 and 52, or the reflective fiber ends. As previously noted, transit time may be used to determine the distance values. For velocity calculations, the velocity simulated by the frequency offset introduced at the modulation device 60 is determined using a Doppler-related algorithm.

Step 74 compares the calculated distance and/or velocity values with the expected values. The expected values are those values that a properly calibration LIDAR apparatus will output given the known frequency offset introduced at the modulation device 60 and the known simulated distances for the Bragg gratings 46, 48, 50 and 52, or the reflective fiber ends. If the calculated values do not coincide with the expected values, the LIDAR apparatus 10 is adjusted to provide proper calibrations. The adjustments are made utilizing techniques conventional to calibration operations. That is, the execution of step 76 is not critical to the invention.

While the invention has been described and illustrated as including an integrating sphere 16, other beam-distributing devices may be used, if the diffusion is substantially isotropic and is directed at one or more optical lines adapted for simulating either or both of velocity and distance of remote objects.

I claim:

1. A calibration system for a light-emitting apparatus which bases determinations relating to remote objects upon received backscattered light comprising:

an optical line having a first end;

reflective means connected to said line for inducing light reflection at a fixed distance from said first end of said optical line; and distributing means for diffusing light emitted from said light-emitting apparatus substantially isotropically within a reflective cavity defined by said distributing means, said first end of said optical line being disposed relative to said reflective cavity to receive diffused light and to direct light reflected by said reflective means toward said distributing means for return to said light-emitting apparatus.

2. The calibration system of claim 1 wherein said distributing means is an integrating sphere and said optical line is a first optical fiber having said first end at a spherical wall of said integrating sphere, said reflective cavity being a substantially spherical interior of said integrating sphere.

3. The calibration system of claim 2 wherein said first optical fiber has a second end at said spherical wall such that said first optical fiber forms an optical loop.

4. The calibration system of claim 2 further comprising at least one second optical fiber having an end at said spherical wall, each second optical fiber having an associated reflective means for inducing light reflection at a second distance different than said fixed distance defined by said reflective means of said first optical fiber, said first and second optical fibers thereby simulating objects at different distances from said light-emitting apparatus.

5. The calibration system of claim 1 wherein said reflective means includes a first Bragg grating at said fixed distance from said first end of said optical line to simulate an object of interest in response to reflection of light by said first Bragg grating.

6. The calibration system of claim 5 further comprising a second Bragg grating along said optical line in spaced relation to said first Bragg grating to simulate a second object of interest in response to reflection of light by said second Bragg grating.

7. The calibration system of claim 1 further comprising a means along said optical line for shifting the frequency of said reflected light to simulate Doppler shifts initiated by moving objects.

8. The calibration system of claim 7 wherein said means for shifting the frequency is one of an acousto-optic modulator and an electro-optic modulator coupled to said optical line between said first end and said reflective means.

9. The calibration system of claim 1 wherein said optical line is a multimode optical fiber and said reflective means includes at least one Bragg grating along said multimode optical fiber.

10. A calibration system for a light detection and ranging (LIDAR) apparatus comprising:

an integrating sphere having an aperture aligned with said LIDAR apparatus to receive an incoming beam into a substantially spherical interior and to direct a return light signal to said LIDAR apparatus;

a plurality of optical fibers having first ends located at said integrating sphere such that each optical fiber is in optical communication with said substantially spherical interior; and reflectors positioned along said optical fibers to reflect light propagating from said first ends for return to said substantially spherical interior, said reflected light forming said return light signal to said LIDAR apparatus.

11. The calibration system of claim 10 further comprising means along at least one of said optical fibers for modulating the frequency of light propagating through said at least one optical fiber, thereby simulating a Doppler shift.

12. The calibration system of claim 11 wherein said means for modulating includes an electrical signal generator connected to drive one of an acoustic-optic modulator and an electro-optic modulator coupled to said at least one optical fiber.

13. The calibration system of claim 10 wherein said substantially spherical interior of said integrating sphere has a diameter which is at least five times as great as a diameter of said aperture aligned with said LIDAR apparatus.

14. The calibration system of claim 10 wherein said reflectors are Bragg gratings.

15. A method of calibrating a light-emitting apparatus which bases determinations of ranges of remote objects upon received backscattered light comprising steps of:

positioning an output beam of said apparatus relative to an aperture of an integrating sphere such that said output beam impinges a substantially spherical interior surface of said integrating sphere, which substantially isotropically diffuses said output beam, thereby significantly attenuating light intensity;

simulating presence of a remote object at a known distance from said apparatus, including positioning a first end of an optical fiber relative to said surface to receive light from said surface and including reflecting said received light propagating through said optical fiber at a known position relative to said first end;

directing a return light signal from said surface to said apparatus such that said return light signal is representative of said light reflected at said known position of said optical fiber; and adjusting a calculation of the distance of said simulated remote object from said apparatus to coincide with said known distance.

16. The method of claim 15 further comprising a step of simulating movement of said simulated remote object at a known velocity, including modulating the frequency of said light propagating through said optical fiber to simulate Doppler shifts.

17. The method of claim 16 further comprising a step of calibrating calculations of velocity of said simulated movements to coincide with said known velocity.

18. The method of claim 15 further comprising a step of simulating presence of at least one second remote object at a second known distance from said apparatus, including utilizing a corresponding number of second optical fibers.

19. The method of claim 15 wherein said step of simulating said presence of said remote object includes forming a Bragg grating along said optical fiber.

* * * * *

UNITED STATES PATENT AND TRADEMARK OFFICE
CERTIFICATE OF CORRECTION

PATENT NO  : 5,825,464
DATED      : October 20, 1998
INVENTOR(S): John D. Feichtner It is certified that error appears in the above-identified patent and that said Letters Patent is hereby corrected as shown below:

Cover page, Item [73] , insert:
        Lockheed Martin Corporation, Maryland- -.

Signed and Sealed this

Second Day of March, 1999

Attest:

Q. TODD DICKINSON

*Attesting Officer*      *Acting Commissioner of Patents and Trademarks*